United States Patent Office 3,100,153
Patented Aug. 6, 1963

3,100,153
PROCESS FOR PREPARING FLAVORING
COMPOSITIONS
Stanley G. Knight, Madison, Wis., assignor to Wisconsin Alumni Research Foundation, Madison, Wis., a corporation of Wisconsin
No Drawing. Filed Nov. 16, 1960, Ser. No. 69,570
8 Claims. (Cl. 99—116)

The present invention relates to new compositions adapted for use in the flavoring of foodstuffs and the process of preparing the same.

Many foodstuffs such as salad dressing, soups of various kinds as well as baked goods such as crackers, biscuits and the like are flavored with cheese. To impart desired flavor, the cheese employed for the most part is aged cheese such as aged Cheddar or like type aged cheese. Due to the time required for aging (at least 6 months to a year) the aged cheese of this type used for flavoring is necessarily relatively expensive. Attempts to solve this problem by using various types of modified short aging periods in an effort to reduce costs have proven unsatisfactory as a substantial aging period has been found necessary to develop the desired flavoring characteristics. Also, due to the bulk of the cheese with its substantial water content, transportation and storage of aged cheese has also posed cost problems particularly with large manufacturers such as large soup manufacturers who have found it necessary to store thousands of pounds of flavoring cheese to have it readily available for daily use.

The principal object of the present invention is to provide improved, relatively inexpensive flavoring compositions.

Another object of the present invention is to provide a practical process for producing a low cost composition adaptable for imparting desired cheese flavors to foodstuffs.

Other objects will be apparent as the description proceeds.

In my investigations in this field, I discovered that certain Penicillium molds and specifically *Penicillium roqueforti*, including white mutants thereof, and *Penicillium camemberti* could be grown rapidly under certain conditions in milk or mixtures of milk and cream and that the resulting products were adaptable for use, without aging, for flavoring foodstuffs. Homogenization of the butter fat in the milk and cream along with aeration and maintaining the medium free from unwanted bacterial contaminates were found necessary for proper growth and development of the flavoring compositions. Cultures of *Penicillium roqueforti*, used in the manufacture of Roquefort cheese and blue cheese, and *Penicillium camemberti*, used in the manufacture of Camembert cheese, are standard articles of commerce and are readily available. The white mutants of *Penicillium roqueforti* can be prepared by irradiation of *Penicillium roqueforti* as described by Knight et al., Jl. Dairy Science, 33, 929–933 (1950). One of the preferred mutants is the white mutant (U.W.–12) used to prepare cheese free from colored venation (now known as nuworld cheese) disclosed in U.S. Patent No. 2,665,990. In addition to the molds noted above, other equivalent filamentous fungi including *P. citrium*, *P. expansum*, *P. janthinellum*, *P. chrysogenum*, *P. spiculisporus*, *P. vermiculatum*, *A. fumigatus*, *A. ochraceus*, *A. flavus*, *A. niger*, *A. ruber*, *A. alliaceus*, *A. carneus*, *A. amstelodami*, *A. versicolor*, *Scopulariopsis brevicaulis*, *Paecilomyces varioti*, *Curvularia lunata*, etc., can be employed. These fungi are characterized by their ability to convert fatty acids to ketones, discussed in detail below, when fermented under submerged aerobic conditions.

During my investigations of the conversion of fats, e.g., milk fat, to highly flavored compositions with filamentous fungi, e.g., *P. roqueforti*, it was noted that the fermentation period using vegetative inoculum (mold cells in mycelium form with nutrient growth medium) was relatively short, e.g., 2 days, compared to the fermentation period, e.g., 5–6 days, using mold conidia or conidiospores. It was also noted that the fermentation period using, e.g., 7 day old, spore containing vegetative inoculum or spores alone was longer than that required with young, e.g., 2 day old, substantially spore-free vegetative inoculum. In view of this it was assumed that the spores as such were relatively inert and that vegetative inoculum and preferably young inoculum should be used. Investigations also disclosed that the fermentation mechanism apparently proceeded first by the hydrolysis or splitting of the fats and then by the conversion of the resulting free fatty acids to the desired highly flavored aromatic ketones. It was also noted that the development of the desired flavor could be hastened by the addition of small amounts of lipase or like fat splitting enzyme. See Farnham Patent 2,531,329. Up to this time, however, it appeared that the use of vegetative inoculum with accompanying growth media (with or without added fat splitting enzymes) was necessary for short fermentation periods, although it was appreciated that the use of spores could be otherwise advantageous in that it was easier, using a spore inoculum, to avoid or control unwanted secondary reactions caused by bacteria, etc.

In continued investigations it was noted, after lipase modified the milk fat, that the resulting mixture containing free fatty acids derived from the milk fat was converted to the desired highly flavored composition much more rapidly by the old spore containing vegetative inoculum, in which the cells were relatively inactive, than by the young substantially spore-free inoculum, in which cells were known to be relatively active. With this unexpected discovery it was then decided to try the following experiment. Milk fat was first modified with lipase to release free fatty acids. Conidia or conidiospores of *Penicillium roqueforti* were then added to the modified fat mixture (free fatty acids derived from the milk fat) and the mixture subjected to fermentation under submerged aerobic conditions. In a matter of minutes it was noted that the spores (heretofore considered inert) were converting the free fatty acids to ketones. Instead of days, desired flavor was obtained in this manner in hours.

Investigations based on the above have shown that the young active vegetative inoculum provides enzymes for splitting the fat and that the free acids are then converted to ketones when spores are produced in the old relatively inactive vegetative inoculum. In this action the spores introduce a ketone (C=O) group on the number 3 carbon atom and then decarboxylate the fatty acid. This can be illustrated as follows:

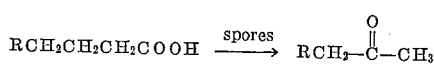

$$RCH_2CH_2CH_2COOH \xrightarrow{\text{spores}} RCH_2-\overset{O}{\underset{\|}{C}}-CH_3$$

where R is an alkyl group, e.g., containing 1–18 or more carbon atoms.

Free fatty acids can be used as such where available and where not available they can be made readily by chemical hydrolysis of fats or by modification of the corresponding fats, e.g. milk fat, by use of fat splitting enzymes such as lipase. While homogenization of the fat or fatty acid is not essential where the process is carried out with agitation or agitation accompanying aeration, the use of homogenized fat or aqueous fat emulsions such as in homogenized milk fat is preferred both for the conversion of the fat to free fatty acid by the enzymes and the conversion of the fatty acid to the ketone by the spores. The overall action of the enzymes and spores is materially speeded up when the fat and fatty acid are dispersed in minute particles to provide large areas of surface.

The process can be readily carried out in an aqueous medium, e.g. pasteurized, homogenized milk containing milk fat or fatty acids derived from milk fat, at temperatures of about 20–35° C. (preferably about 25–30° C.) in a fermenter of the type used for submerged aerobic fermentation in the production of antibiotics such as penicillin. As in antibiotic production, sterilization or equivalent treatment such as pasteurization, which eliminates bacteria which deleteriously effect fermentation, is necessary. The inoculation of the medium with the fungi is also similar to the procedures employed in the production of penicillin. One of the preferred ways of making an inoculum for use in the present invention is to grow or culture the mold for 2–3 days in pasteurized or sterilized whole or skim milk at about room temperature in a fermenter of the type just described except that it may be smaller. The resulting vegetative inoculum (mold cells in mycelium form and growth medium) can be used in a pasteurized as well as a sterilized fat containing milk medium and provides for a relatively short fermentation period of about 1.5–2.5 days. Mold spores can also be used alone and while this inoculum makes it somewhat easier to avoid or control unwanted secondary reactions caused by bacteria, its use with milk fat has the disadvantage in that it requires a fermentation period of about 5–6 days. As pointed out above, one apparent reason for this is that it is first necessary for the spores to germinate and produce enzymes which split or hydrolyze the fats and release the fatty acids before the spores in the fermenting medium can convert the fatty acids to the desired highly flavored ketones. Fatty acids are produced faster than ketones can be formed and as a result the excess acids may unbalance the flavor. In view of this, mold spores as well as a highly sporulated vegetative inoculum can be used to advantage in a relatively short fermentation period with an aqueous medium containing free fatty acids, e.g. whole milk or cream in which the milk fat has been previously treated with lipase to split the fats and release the free fatty acids.

After fermentation the broth can be used as such or be condensed with or without vacuum down to 50 percent or more in volume. This product can be used as such or be dried under the same conditions used to dry milk, as for example, spray dried, vacuum drum dried, etc. Temperatures which cause darkening or caramelization of the product should be avoided. The following examples will serve to illustrate the invention.

*Example I*

The fermenter is first charged with 1000 lbs. of a homogenized mixture of whole milk and cream in a ratio of about 1 to 1 by volume to provide a mixture containing about 12 percent fat. The mixture is then sterilized with live steam at about 15 lbs. pressure for about 20 minutes. After cooling the mixture is then inoculated aseptically with about 50–100 lbs. of a vegetative inoculum containing mold cells of a white mutant of *Penicillium roqueforti*. The mixture is then agitated with aeration at about 1 vol./min. and at a temperature of about 25–30° C. for about 2 days. The fermented mixture is then preheated to about 140° F. and spray dried in swirling air with an inlet temperature of about 225–325° F. and an outlet temperature of about 150–170° F. to yield a highly flavored product adaptable for use in the flavoring of foodstuffs.

*Example II*

This example is in accordance with Example I, except that the mixture of homogenized milk and cream is pasteurized and then inoculated with a vegetative inoculum of *Penicillium roqueforti*, and the resulting bluish-green mixture after fermentation is condensed down to about 50 percent of its original volume.

*Example III*

This example is in accordance with Example I, except that a sterile homogenized milk (without cream) containing about 3.5 percent fat is employed with a vegetative inoculum of *Penicillium camemberti*. A low fat medium is generally employed with this mold as the *Pencilllium camemberti*, unlike *Penicillium roqueforti*, has little lipolytic activity being primarily proteolytic in character. Hence, the resulting flavored product has comparatively little of the ketone flavor of blue cheese but more of the camembert flavor resulting from the proteolysis.

*Example IV*

The fermenter is charged with about 1000 lbs. of condensed milk containing about 7 percent butter fat and is sterilized and inoculated and aerated as in Example I. After fermentation for about 1.5 days, about 3–4 ounces of the lipase (fat-splitting) enzyme composition of Patent No. 2,531,329, supra (available as the Italase from Dairyland Food Laboratories), is added and fermentation continued for about another 12 hours. The highly flavored broth is then spray dried under similar conditions employed in the spray drying of molk as in Example I.

*Example V*

This example is in accordance with Example IV, except that condensed milk is pasteurized and is first treated with lipase until at least about one percent more or less depending upon the flavor desired of the milk fat is converted to fatty acids. The resulting milk-fatty acid mixture is next heated to about 165° F. to deactivate the lipase and is then inoculated with a highly sporulated inoculum and fermented as in Example IV after the addition of the lipase.

The culture or fermentation medium as indicated above can vary. Where a vegetative inoculum containing few spores is used, an aqueous nutrient culture medium containing available carbon and nitrogen, in addition to fats or fatty acids, such as homogenized milk with or without homogenized cream, is required so that the mold can grow and produce the spores required to convert the fatty acids to ketones. Where spores or a highly sporulated vegetative inoculum is used with fats, a similar type nutrient medium is required so that the spores can germinate and grow and produce the enzymes required to release the fatty acids to be converted to the ketones by the new spores formed in the fermenting medium. Where spores or a highly sporulated vegetative inoculum is used with fatty acids such as derived from milk fat by lipase, an aqueous fermentation medium free or substantially free from nutrients can be used as the spores can convert the free fatty acids directly to the desired ketones without germinating or growth in a nutrient medium. For most purposes, using spores with either fats or fatty acids or mixtures of the same, it is preferred to use pasteurized, homogenized milk as the aqueous medium for carrying out the fermentation. Using spores and fatty acids in a nutrient medium of this type, there is little or no germination of the spores in the relatively short period required to produce a highly flavored product. Optimum fermentation periods, however, will vary depending on the culturing conditions, activity of the inoculum as well as the flavor desired.

Other filamentous fungi such as noted above, can be used in place of the fungi used in the illustrative examples. Equivalent fats or fatty oils including vegetable oils such as corn, peanut and soya bean oils and animal fats or oils such as lard, homogenized in milk, skim milk and the like can also be used in place of the milk or butter fat. Pre-condensed milk reduced up to 50 percent by volume can also be used in or as the culture media with or without cream or added vegetable or animal fats to supply additional fat. Milk solids such as skim milk solids can also be added to the milk or milk and cream mixtures. The aeration with sterile air can vary but should be sufficient to provide rapid growth. Aeration up to about 1 volume of air per minute per volume of broth has proven satisfactory. Antifoaming agents of the non-toxic type employed in antibiotic production can also be used.

In addition to lipase or like fat-splitting enzyme, the flavor can also be built up more rapidly by the addition of a small amount of proteinase or proteolytic enzyme such as trypsin. The proteinase can also be used in combination with lipase.

The compositions of the present invention can be used in liquid form by condensing the fermented broth but are ordinarily dried to remove water and reduce transportation charges. The dried product substantially free from water is also considerably more stable than aqueous mixtures. The compositions which are relatively inexpensive as they require no aging, can be used for flavoring generally in the foodstuff field including the salad dressing, soup and baked goods fields, where aged cheese has been employed heretofore.

This application is a continuation-in-part of my prior applications Serial No. 672,557, filed July 18, 1957, now abandoned, and Serial No. 760,840, filed September 15, 1958.

I claim:

1. A process of manufacturing a composition adaptable for use in the flavoring of foodstuffs which comprises fermenting pasteurized, homogenized milk containing milk fat under submerged aerobic conditions with *Penicillium roqueforti*.

2. A process of claim 1 where a lipase is added to the fermenting mixture.

3. A process of claim 1 where a proteinase is added to the fermenting mixture.

4. A process of claim 1 where the pasturized milk is first treated with lipase to convert milk fat to fatty acids and the resulting milk-fatty acid mixture is fermented with *Penicillium roqueforti*.

5. A process of claim 1 where the composition is produced by fermenting with a white mutant of *Penicillium roqueforti*.

6. A process of manufacturing a composition adaptable for use in the flavoring of foodstuffs which comprises sterilizing a homogenized mixture of milk and cream, inoculating the sterilized homogenized mixture of milk and cream with a vegetative inoculum of *Penicillium roqueforti*, fermenting the resulting mixture under submerged aerobic conditions for about 1.5–2.5 days at a temperature of about 25–30° C., and then drying the resulting highly flavored fermented mixture.

7. A process of manufacturing a composition adaptable for use in the flavoring of foodstuffs which comprises inoculating pasteurized milk containing milk fat with a vegetative inoculum of *Penicillium roqueforti*, fermenting the resulting mixture under submerged aerobic conditions to release free fatty acids produced by the hydrolysis of milk fat and converting the free fatty acids derived from the milk fat to ketones by fermenting the mixture under submerged aerobic conditions in a fermentation medium containing spores of *Penicillium roqueforti*.

8. In the process of manufacturing a composition adaptable for use in the flavoring of foodstuffs, the improvement which consists in converting fatty acids derived from milk fat to ketones by fermenting the fatty acids under submerged aerobic conditions in a fermentation medium containing spores of *Penicillium roqueforti*.

References Cited in the file of this patent

UNITED STATES PATENTS 2,965,492   Bauman et al. _____ Dec. 20, 1960

OTHER REFERENCES

Prescott et al.: Industrial Microbiology, 2nd edition, McGraw-Hill Book Company, Inc., New York, 1949, pp. 472, 473 and 562.